3,383,164
REMOVAL OF CARBON MONOXIDE
Allan C. Harkness, Vancouver, British Columbia, Canada, assignor to Allis-Chalmers Manufacturing Company, Milwaukee, Wis.
No Drawing. Continuation-in-part of application Ser. No. 176,914, Mar. 2, 1962. This application May 27, 1965, Ser. No. 459,429
12 Claims. (Cl. 23—2)

This is a continuation-in-part of my now abandoned United States application Ser. No. 176,914, filed Mar. 2, 1962.

The present invention relates generally to the removal of carbon monoxide from gases and more particularly to improved compositions and methods employing a novel catalytically activated mechanism for removing carbon monoxide from gas streams in a rapid and easy manner.

While it has heretofore been known that carbon monoxide could be oxidized by an acidified aqueous solution of potassium permanganate according to the reaction:

(a) $\quad 3CO + 2MnO_4^- + 2H^+ \rightarrow 3CO_2 + MnO_2 + H_2O$ the reaction is thermodynamically spontaneous, but kinetically sluggish and because of its slow rate it is not commercially feasible.

Also heretofore known is that solid silver permanganate oxidizes carbon monoxide, but solid silver permanganate is expensive to use because one mole of silver is necessarily present for every mole of the permanganate.

Carbon monoxide (CO) is a toxic gas even in minute quantities. I have discovered a process for purifying a CO contaminated gas stream by passing it through an acidified permanganate ($MnO_4^-$) solution to oxidize the CO to carbon dioxide ($CO_2$). I have found that the oxidation rate is vastly increased by inclusion of minute catalytic quantities of silver ion ($Ag^+$) and/or mercuric ion ($Hg^{2+}$) in the $MnO_4^-$ solution.

Accordingly, the general object of my invention is to provide a method for the oxidation of carbon monoxide to carbon dioxide in a gas-liquid phase reaction using a non-noble source of permanganate and a catalytic amount of either silver or mercuric ion.

Still another object of my present invention is to provide a method for removing carbon monoxide from gaseous streams which lends itself to reasonably small installations while at the same time providing a volume which is commercially feasible.

These and still further objects as shall hereinafter appear are fulfilled by the present invention in a totally unexpected manner as may be readily discerned from the following detailed description of an exemplary embodiment of the present invention.

In order to conveniently follow the kinetics of my catalyzed reaction, I lowered the silver ion concentration to about $1 \times 10^{-5}$ M and worked with temperatures ranging from 0–25° C. The rate of carbon monoxide oxidation in my reaction is described by the following rate expression:

(b) 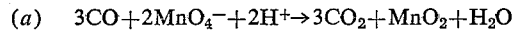
$$\frac{-d[CO]}{dt} = [CO][MnO_4^-]\{k_1 + k_2[X]\}$$

wherein: $k_1$ is the rate constant of the uncatalyzed reaction (e.g., 0.52 M$^{-1}$ sec.$^{-1}$ at 25° C.); $k_2$ is the rate constant of the catalyzed reaction (M$^{-2}$ sec.$^{-1}$); and [X] is the concentration of the catalyst ion (M). As used herein, M signifies "moles/liter."

While both silver and mercuric ions have been found catalytic for the reaction, silver ions are considerably more effective than the mercuric ions. Thus, at 0° C. in 1 M perchloric acid, $k_2$ for silver ions is $1.10 \times 10^5$ M$^{-2}$ sec.$^{-1}$ while $k_2$ for mercuric ions at 0° C. in 1 M perchloric acid is $1.06 \times 10^3$ M$^{-2}$ sec.$^{-1}$.

In formulating my solution, any soluble permanganate may be used to provide the desired level of permanganate ion concentration although the permanganates of the more costly metals such, for example, as cadmium, zinc and the like, are avoided for economic reasons. The permanganates of the alkali and alkaline earth metals perform very well and carry a cost which is practical. For this reason, their use is recommended.

Similarly, my tests show that any simple soluble silver or mercuric salt may be employed to provide the desired catalyst ion concentration. Thus, for example, silver nitrate; mercuric nitrate; silver perchloroate; mercuric perchlorate; silver sulfate and mercuric sulfate all perform satisfactorily. It has been noted that mercurous salts may also be employed but, as is apparent, the effective catalytic ion will still be mercuric for the permanganate would promptly oxidize the mercurous ion to the mercuric ion. As before, the effective catalytic activation would be obtained.

As "soluble" is used herein with respect to my catalytic reagents, it means possessing sufficient solubility to provide a small but effective ion concentration. An effective ion concentration is that which is sufficient, in Equation $b$ above, to provide ($k_2$[X]) with a value greater than $k_1$ at the reaction temperature. Thus, at 25° C. it will be necessary for ($k_2$[X]) to be greater than 0.52 M$^{-1}$ sec.$^{-1}$, that is, in the case of silver, X must be greater than $3.71 \times 10^{-6}$ M. It also becomes apparent that certain silver salts which are normally considered insoluble are still sufficiently soluble for use in the practice of this invention. Thus, silver chloride, with its solubility of about $1 \times 10^{-5}$ M, while generally considered insoluble, provides sufficient ion concentration to be operable in the invention.

The solvent I prefer to employ is aqueous perchloric acid although any solvent capable of providing a pH of seven or less, and preferably four or less, which is compatible with permanganate, i.e., is not oxidized by it, and which does not complex with the metal ions to a substantial extent will be satisfactory. Thus, at room temperature, sulfuric, nitric and hydrochloric acids may also be employed as the solvents. Of these, sulfuric acid is preferred.

My results further indicate an increased activity resulting from increased temperature although the instantaneous occurrence of the reaction at room temperatures renders it generally unnecessary to operate at temperatures in excess of room temperatures.

Thus, $k_2$ (see Equation $b$ above) for silver ions at 0° C. is $1.10 \times 10^5$ M$^{-2}$ sec.$^{-1}$ while this becomes $1.40 \times 10^5$ M$^{-2}$ sec.$^{-1}$ at 25° C. Similarly, $k_2$ for the mercuric ions is $1.06 \times 10^3$ M$^{-2}$ sec.$^{-1}$ at 0° C. and $2.40 \times 10^3$ M$^{-2}$ sec.$^{-1}$ at 25° C.

In the preferred practice of the present invention an excess of permanganate is used so as to maintain the permanganate ion concentration in the solution relatively constant whereby the reaction (see $b$ above) becomes a pseudo-first order reaction and the reaction rate is directly proportional to the concentration of carbon monoxide. Thus, knowing the volume of the gas to be treated and the amount of carbon monoxide to be removed, the size of the reaction vessel and the amount of catalyst to be used can be readily calculated using Equation b above.

The activation energy of my reaction, derived by calculating the rate constant at various temperatures and employing the Arrhenius equation, to wit:

(c) $$\log_e k_2 = A - E/RT$$

where:

$k_2$ is the rate constant;
A is an equation constant;
E is activation energy;
R is the gas constant, and
T is the temperature in degrees absolute;
E is 1.8 kcals./mole for $Ag^+$, and 7.0 kcal./mole for $Hg^{++}$;
E for the uncatalyzed reaction is 13.6 kcal./mole.

Of course in the practice of my invention, silver ion and mercuric ion can be used either singly or in combination to provide the catalytic activity.

Now utilizing my discovery, a continuous process that does not require interruption to recharge the system with either oxidant or catalyst, or to remove spent oxidant has been provided. In practicing my invention as a continuous process, a gas stream of carbon monoxide contaminated gas is passed through a scrubber containing the catalytic solution. The CO when scrubbed with the acidified permanganate solution containing a catalytic quantity of either silver ion, mercuric ion or a mixture of silver ion and mercuric ion oxidizes the CO to $CO_2$. The purified gas stream is passed out of the system, while the catalytic solution can be directed through a filtering means to trap and remove the precipitate of manganese dioxide before returning to the scrubber. Fresh permanganate, to replenish that lost by reduction to manganese dioxide, is added to the catalytic solution.

From the foregoing it becomes apparent that a unique and effective system for the removal of carbon monoxide has been described which fulfills all of the aforestated objectives to a remarkably unexpected extent. It further is apparent that a system utilizing a gas-liquid phase reaction has been described which may be employed either in gas analysis or in the purification of recycling exit gases employed in catalytic hydrogenation. Other beneficial applications are obvious from these teachings which require only that the gas stream containing carbon monoxide be passed through a solution containing permanganate ions having a pH of seven or less and containing a molar excess of permanganate ions activated by a small but effective amount of catalyst selected from the group consisting of the ions of silver, mercuric and mixtures of these.

It is, of course, understood that such modifications, alterations and applications as may occur to one skilled in the art from a consideration of this disclosure are intended within the spirit of the present invention, especially as it is defined by the scope of the claims appended hereto.

The embodiments of the invention in which an exclusive property or privilege is claimed are defined as follows:

1. The method of removing carbon monoxide from a gaseous stream utilizing a gas-liquid phase reaction comprising forming an aqueous solution containing permanganate ions; adjusting the pH of said solution to a value not exceeding 7; adding to the solution a catalytic reagent to provide said solution with a small but effective amount of ions selected from the group consisting of silver ion and mercuric ion; and contacting said gaseous stream with said solution whereupon the carbon monoxide in said stream is substantially completely and rapidly oxidized to carbon dioxide, and removing said now substantially carbon monoxide free gaseous stream from contact with said solution.

2. The method of removing carbon monoxide from a gaseous stream utilizing a gas-liquid phase reaction comprising forming an aqueous solution containing permanganate ions; adjusting the pH of said solution to a value not exceeding 7; adding to the solution a catalytic reagent to provide said solution with a small but effective amount of silver ions; and contacting said gaseous stream with said solution whereupon the carbon monoxide in said stream is substantially completely and rapidly oxidized to carbon dioxide, and removing said now substantially carbon monoxide free gaseous stream from contact with said solution.

3. The method of removing carbon monoxide from a gaseous stream utilizing a gas-liquid phase reaction comprising forming an aqueous solution containing permanganate ions; adjusting the pH of said solution to a value not exceeding 7; adding to the solution a catalytic reagent to provide said solution with a small but effective amount of mercuric ions; and contacting said gaseous stream with said solution whereupon the carbon monoxide in said stream is substantially completely and rapidly oxidized to carbon dioxide, and removing said now substantially carbon monoxide free gaseous stream from contact with said solution.

4. In a continuous process for purifying a carbon monoxide contaminated gas stream, the steps comprising: passing said carbon monoxide contaminated gas stream into a scrubber means for intimately contacting said gaseous stream with an acidified permanganate solution containing a quantity of ions selected from the group consisting of silver ion and mercuric ion in a concentration less than the concentration of permanganate ion; passing the now substantially carbon monoxide free gaseous stream from said scrubbing means; cycling the permanganate solution from the scrubber through a filtration means for removing insoluble manganese dioxide from the permanganate solution; and adding sufficient permanganate to replenish that lost through reduction.

5. In a continuous process for purifying a carbon monoxide contaminated gas stream, the steps comprising: passing said carbon monoxide contaminated gas stream into a scrubber means for intimately contacting said gaseous stream with an acidified permanganate solution containing a quantity of silver ions in a concentration less than the concentration of permanganate ion; passing the now substantially carbon monoxide free gaseous stream from said scrubbing means; cycling the permanganate solution from the scrubber through a filtration means for removing insoluble manganese dioxide from the permanganate solution; and adding sufficient permanganate to replenish that lost through reduction.

6. In a continuous process for purifying a carbon monoxide contaminated gas stream, the steps comprising: passing said carbon monoxide contaminated gas stream into a scrubber means for intimately contacting said gaseous stream with an acidified permanganate solution containing a quantity of mercuric ions in a concentration less than the concentration of permanganate ion; passing the now substantially carbon monoxide free gaseous stream from said scrubbing means; cycling the permanganate solution from the scrubber through a filtration means for removing insoluble manganese dioxide from the permanganate solution; and adding sufficient permanganate to replenish that lost through reduction.

7. In a continuous process for purifying a carbon monoxide contaminated gas stream, the steps comprising: passing said carbon monoxide contaminated gas stream into a scrubber means for intimately contacting said gaseous stream with an acidified permanganate solution containing a small but effective quantity of ions selected from the group consisting of silver ion and mercuric ion; passing the now substantially carbon monoxide free gaseous stream from said scrubbing means; cycling the permanganate solution from the scrubber through a filtration means for removing insoluble manganese dioxide from the permanganate solution; and adding sufficient permanganate to said permanganate solution to replenish that lost through reduction.

8. The method of purging a gaseous stream of carbon monoxide contaminant utilizing a gas-liquid phase reaction comprising: forming the liquid phase containing an aqueous solution of an alkali metal permanganate; adding sufficient perchloric acid to said solution to adjust the pH to a value not exceeding 7; adding to said pH adjusted solution a catalytic reagent sufficient to provide said solution with a concentration of ions selected from the group consisting of silver, mercuric, and a mixture of silver and mercuric, said concentration less than the concentration of permanganate ions in said solution; intimately contacting the gaseous phase carbon monoxide contaminated gaseous stream with said liquid phase whereby said carbon monoxide is substantially instantaneously oxidized to carbon dioxide, and removing carbon monoxide free gaseous phase from said liquid phase.

9. The method according to claim 8 in which said catalytic reagent is selected from the group consisting of silver perchlorate, mercuric perchlorate, silver nitrate, mercuric nitrate, silver sulfate, mercuric sulfate, and mixtures of at least two compounds of said group.

10. The method according to claim 8 in which said alkali metal permanganate is potassium permanganate.

11. The method according to claim 10 in which said catalytic reagent is silver perchlorate.

12. The method according to claim 10 in which said catalytic reagent is silver nitrate.

References Cited

UNITED STATES PATENTS 2,657,182  10/1953  Katz _____ 23—2 X
2,876,507  3/1959  Kuehner et al. _____ 23—58

OTHER REFERENCES

Mellor, "A Comprehensive Treatise on Inorganic and Theoretical Chemistry," Longmans, Green & Co., New York, N.Y., volume 12, 1932, pages 297 and 332.

OSCAR R. VERTIZ, *Primary Examiner.*

E. C. THOMAS, *Assistant Examiner.*